United States Patent [19]

Dawson et al.

[11] 4,393,174

[45] Jul. 12, 1983

[54] BASE HYDROLYSIS OF PENDANT AMIDE POLYMERS

[75] Inventors: Daniel J. Dawson, Los Altos; Phillip J. Brock, Sunnyvale, both of Calif.

[73] Assignee: Dynapol, Palo Alto, Calif.

[21] Appl. No.: 319,614

[22] Filed: Nov. 9, 1981

[51] Int. Cl.$^3$ ............................................. C08F 8/12
[52] U.S. Cl. ................................. 525/369; 525/371; 525/378; 525/328.2; 525/329.4
[58] Field of Search ................. 525/369, 378; 526/312

[56] References Cited

U.S. PATENT DOCUMENTS

| | | | |
|---|---|---|---|
| 3,784,597 | 1/1974 | Fujimoto et al. | 260/80.3 N |
| 4,221,888 | 9/1980 | Kawakami et al. | 525/369 |
| 4,238,579 | 12/1980 | Leonard, Jr. et al. | 525/330 |
| 4,254,249 | 3/1981 | Cottrell et al. | 526/303 |
| 4,255,548 | 3/1981 | Wingard, Jr. et al. | 526/310 |
| 4,283,507 | 8/1981 | Phillips et al. | 525/344 |
| 4,322,511 | 3/1982 | Matsuda et al. | 525/344 |

*Primary Examiner*—Joseph L. Schofer
*Assistant Examiner*—Bernard Lipman
*Attorney, Agent, or Firm*—Burns, Doane, Swecker & Mathis

[57] ABSTRACT

Pendant amide polymers, especially polymers containing N-vinylacetamide, N-alkyl-N-vinylacetamide, or N-vinyl-formamide units, are hydrolyzed to pendant amine polymers, especially vinylamine polymers by contact with strong aqueous base at elevated temperature.

10 Claims, No Drawings

BASE HYDROLYSIS OF PENDANT AMIDE POLYMERS

BACKGROUND OF THE INVENTION

1. Field of the Invention

This invention is in the field of polymer chemistry. Particularly, it concerns a process for hydrolyzing polymeric pendant amides to polymeric pendant amines.

2. The Prior Art

U.S. Pat. Nos. Re 30,362 of Gless et al and 4,176,136 of Brenzel disclose processes for preparing N-vinylacetamide. U.S. patent application Ser. No. 318,615 of Otteson et al filed Nov. 5, 1981 discloses a process for preparing N-vinylformamide. These references further disclose that these materials are polymerizable and that the resulting poly(N-vinylacetamide) or poly(N-vinylformamide) can be hydrolyzed to give poly(N-vinylamine). The possibility of N-alkyl substituted acetamides and amines is also taught by the art. Similar teachings in a copolymer setting are provided by the references listed in Table I.

TABLE I

| Reference | Comonomers |
|---|---|
| U.S. Pat. No. 4,255,548 | ethylene |
| U.S. Pat. No. 4,238,579 | styrene |
| U.S. Pat. No. 4,178,442 | vinylsulfonate |

The hydrolysis of these amide groups to amines is not facile. Typically, it has been carried out in refluxing aqueous acid, usually hydrochloric acid. This has two problems. First, few applications of the amine polymers (and certainly not their preferred applications in polymeric colorants) employ acid solutions. This means that the acid present must be removed or neutralized. Second, acidic conditions lead to a side reaction between neighboring amine and amide units—for example,

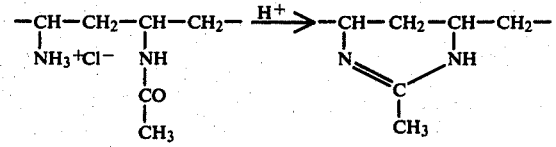

These amidine units are an impurity that decreases the desired amine functionality of the hydrolyzed polymer and are to be avoided.

STATEMENT OF THE INVENTION

It has now been found that pendant amide-containing polymers can be effectively hydrolyzed to their free amine-containing counterparts using high temperature aqueous base. This finding was surprising as one might expect the harsh alkaline conditions to substantially degrade the polymers.

DETAILED DESCRIPTION OF THE INVENTION

Base Hydrolysis Conditions

The base employed is an aqueous solution of a strong base such as sodium or potassium hydroxide or mixtures thereof. Other chemically equivalent base materials might be used but are all substantially more expensive or less effective. The base is used as a 3–20% by weight solution in water. Other fluids can be present but are not required. Preferred base concentrations range from 6 to 15% by weight with concentrations of 8 to 12% and especially 10% being more preferred.

The amount of base used should be at least one equivalent for each equivalent of hydrolysis desired. Generally, from 1 to 2 equivalents of base are employed with from 1.1 to 1.5 equivalents being preferred and 1.2 to 1.3 equivalents being more preferred. The use of a large excess of base or high base concentrations tends to cause polymer precipitation. The concentration of the polymer in the hydrolysis mixture generally ranges from 5% to 20% by weight with concentrations of from 7% to 15% being preferred. In general polymers of lower molecular weight may be hydrolyzed at higher concentrations. High molecular weight polymers must be hydrolyzed at lower concentrations to maintain solubility.

The hydrolysis is conducted at elevated temperatures. 170° C. appears to be about the highest temperature that may be effectively used. At temperatures above 170° C. degradation of the polymer as evidenced by ammonia formation begins to occur. 110° C. appears to be about the lowest effective temperature. At lower temperatures unacceptably long reaction periods are required. Preferred temperatures are from 120° C. to 170° C., with temperatures of from 145° C. to 165° C. being most preferred.

The reaction is usually carried to completion as measured by analysis of intermediate samples of reaction product. As one would expect, the time required is inversely related to the temperature employed. At the highest temperatures, about one hour give complete reaction while at the lowest temperature about forty-eight hours are required. At the preferred temperatures, from three to twelve hours are usually used.

At temperatures above about 100° C., elevated pressures will, of course, have to be employed.

The Polymers Treated

Amide group-containing polymers and copolymers are treated by this invention. These materials include polymers having recurring N-vinylacetamide

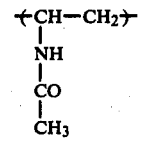

units, polymers having recurring N-alkyl-N-vinylacetamide

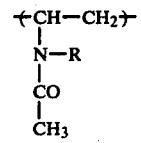

units, wherein R is a lower alkyl such as methyl or ethyl or the like, preferably methyl, and polymers having recurring N-vinylformamide

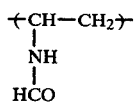

units. The term "recurring" is used in a broad sense to include homopolymers as well as polymers having other copolymeric units. Most commonly, these copolymeric units are free-radical-polymerizable vinyl group-containing units. Representative copolymeric units include lower alkylenes—for example, styrene and alkyl substituted styrenes; as well as heteroatom-substituted lower alkylenes such as various vinyl or acrylic comonomers—for example, acrylic acid, methacrylic acid, vinylsulfonate and the like. It is believed that this invention has application with the entire range of N-vinyl amide-containing polymers and copolymers, bearing in mind the limitation that it should not be used when comonomer units which would be adversely changed by the caustic treatment are present. Generally, the polymers are soluble in the aqueous hydrolysis medium.

Utility of the Products

The amine-containing polymer solutions which result from this process can be employed directly as feedstocks for the preparation of polymeric dyes. This use is disclosed in the references noted in The Background of the Invention, which references are incorporated herein by reference. The solutions can be purified—such as by filtration, precipitation, ultrafiltration or dialysis or the like. They can be further treated—such as by ion exchange. They can be concentrated, dried to give solids or diluted as is required for their shipment, storage or use. All such processing is believed to be conventional.

The invention will be further described by reference to the following examples. These are provided solely for illustration and are not to be read as limitations on the scope of the invention as defined by the claims.

EXAMPLE I

An aqueous poly(vinylacetamide) solution (31.5% by weight polymer) of molecular weight of $1.4 \times 10^5 D$, 24 weight % aqueous sodium hydroxide solution, and deionized water were charged to a nickel reactor. The choice of reactor was based on corrosion and other considerations—a glass-lined vessel would be attacked by the caustic, for example. The feed charge was 127.6 g of polymer (100% basis).
75.0 g of NaOH (100% basis) (1.25 equivalents based on polymer)
1025 g of H₂O total.

The charge was stirred and the temperature was carefully raised to 150° C. where it was maintained. After 300 minutes at temperature, a sample was taken. After 611 minutes at temperature the heat was turned off. The reaction product was sampled. The polymer in the samples was precipitated and the amount of acetate ion present was determined by a sensitive ion chromatography method. The amine content of selected samples was determined by direct titration. These analyses showed that the free amine content had reached a value of 85% of theoretical maximum by the first sample and that conversion was 100% at the second sample.

This hydrolysis product could be used as set forth in the section "Utility of the Products."

EXAMPLES II–VI

The preparation of Example I was repeated at a variety of temperatures with the following results.

| Example | Reaction Temp. °C. | Time, Hrs. | % Completion |
|---|---|---|---|
| II | 120 | 48 | 98 |
| III | 130 | 26 | 98 |
| IV | 140 | 19 | 98 |
| V | 160 | 5 | 99 |
| VI | 170 | 3 | 95 |

EXAMPLE VII

The preparation of Example I is repeated using 1.25 equivalents of KOH in place of 1.25 equivalents of NaOH. Identical effectiveness is noted.

EXAMPLE VIII–X

The preparation of Example I was repeated three times varying the equivalents of base from 1.25 as follows.

| Example | Equivalents of NaOH | Reaction Time(Temp.) | % Completion |
|---|---|---|---|
| VIII | 1.0 + 0.5 | 15 + 5 Hr (130° C.) | 90% |
| IX | 1.0 + 0.5 | 15 + 13 Hr (130° C.) | 98% |
| X | 1.1 | 15 Hr (150° C.) | 98% |

What is claimed is:
1. The process of treating a polymer having recurring pendant amide units having a structure selected from among

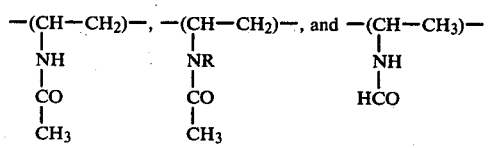

wherein R is a lower alkyl to form pendant amine units which comprises contacting said polymer in liquid phase with aqueous strong base at elevated temperature for a time effective to hydrolyze said amide units to amine units.

2. The process of claim 1 wherein said strong base comprises NaOH or KOH.

3. The process of claim 2 wherein said strong base is present in an amount of from 1 to 2 equivalents based on the equivalents of amide.

4. The process of claim 3 wherein said elevated temperature is from 110° C. to 170° C.

5. The process of claim 4 wherein said time is in the range of from 1 hour to 48 hours.

6. The process of claim 5 wherein the polymer comprises N-vinylacetamide units.

7. The process of claim 5 wherein the polymer comprises N-vinylformamide units.

8. The process of claim 5 wherein the polymer comprises N-lower alkyl-N-vinylacetamide units.

9. The process of claim 5 wherein the polymer is poly(N-vinylacetamide).

10. The process of hydrolyzing poly(N-vinylacetamide) to poly(vinylamine) which comprises intimately contacting 7 to 15% by weight of said polymer with from 1.1 to 1.5 equivalents of NaOH in an aqueous reaction medium at a temperature of from 145° C. to 165° C. for from 3 to 12 hours.

* * * * *